(12) United States Patent
Khokhar

(10) Patent No.: US 6,185,791 B1
(45) Date of Patent: Feb. 13, 2001

(54) RELEASABLE CABLE TIE

(75) Inventor: Wasim Khokhar, Cordova, TN (US)

(73) Assignee: Thomas & Betts International, Inc., Sparks, NV (US)

( * ) Notice: Under 35 U.S.C. 154(b), the term of this patent shall be extended for 0 days.

(21) Appl. No.: 09/165,920

(22) Filed: Oct. 3, 1998

Related U.S. Application Data

(60) Provisional application No. 60/077,257, filed on Mar. 9, 1998.

(51) Int. Cl.[7] .................................................. B65D 63/00
(52) U.S. Cl. ......................................................... 24/16 PB
(58) Field of Search ............................... 24/16 PB, 17 B, 24/17 AP, 30.5 P, 265 CD; 248/74.3; 411/339, 433, 344, 345, 346

(56) References Cited

U.S. PATENT DOCUMENTS

| | | | |
|---|---|---|---|
| 3,339,246 | * 9/1967 | Geisinger | 24/16 PB |
| 3,590,442 | 7/1971 | Geisinger | 24/16 PB |
| 3,860,997 | 1/1975 | Van Riper, Jr. et al. | 24/16 PB |
| 3,908,233 | 9/1975 | Caveney et al. | 24/16 PB |
| 3,991,444 | * 11/1976 | Bailey | 24/16 PB |
| 4,236,280 | * 12/1980 | Kreiseder | 24/16 PB |
| 4,303,216 | 12/1981 | Hollingsead | 248/74.3 |
| 4,631,782 | 12/1986 | Gecs | 24/16 PB |
| 4,728,064 | 3/1988 | Caveney | 248/74.3 |
| 4,958,414 | * 9/1990 | Benoit | 24/16 PB |
| 5,193,250 | * 3/1993 | Caveney | 24/16 PB |
| 5,379,494 | * 1/1995 | Shirakawa | 24/16 PB |
| 5,414,904 | 5/1995 | Sampson | 24/16 PB |
| 5,513,421 | 5/1996 | Wells | 24/16 PB |
| 5,621,949 | 4/1997 | Wells | 24/16 PB |
| 5,630,252 | * 5/1997 | Wells | 24/16 PB |
| 5,956,813 | * 9/1999 | Cooper | 24/16 PB |

FOREIGN PATENT DOCUMENTS

| | | | |
|---|---|---|---|
| 25 08 230 A1 | * 9/1976 | (DE) | 24/16 PB |
| 26 15 821 A1 | * 11/1976 | (DE) | 24/16 PB |

* cited by examiner

Primary Examiner—Anthony Knight
Assistant Examiner—Robert L. Pilaud
(74) Attorney, Agent, or Firm—Hoffman & Baron, LLP

(57) ABSTRACT

A releasable cable tie including a head, a tail, and an elongate strap body therebetween having plurality of teeth thereon. The head includes a passageway for receiving the tail and strap body and a slot formed in one sidewall which is in communication with the passageway, the strap body being insertable into the passageway in a locking direction for forming a loop to receive the objects to be bound. First and second shoulders are integrally attached to the first sidewall on opposite sides of the slot in opposing relation. The shoulders include first and second upwardly extending reinforcing extensions, respectively, which are each spaced a predetermined distance from the first sidewall so as to create an interstice between the extensions and first sidewall. A bridging member extends between the first and second shoulders. The head further includes a latch for releasably retaining the strap body within the head which is pivotally mounted on the bridging member and has at least one locking tooth complementary to each of the plurality of teeth on the strap body. The latch extends into the passageway through the slot such that the locking tooth engages a selected one of the plurality of teeth for substantially preventing movement of the strap body in a release direction. When the cable tie is under load in a locked position, the first and second reinforcing extensions deflect to engage the first sidewall for adding strength to the latch which enables the tie to withstand greater tensile forces. Because the latch is pivotal about the longitudinal axis of said bridging member, it may be pivoted to release the locking tooth from engagement with the selected one of plurality of teeth to permit the strap body to be moved in the release direction, the strap body being easily releasable from the head thereby allowing the tie to be reusable.

8 Claims, 4 Drawing Sheets

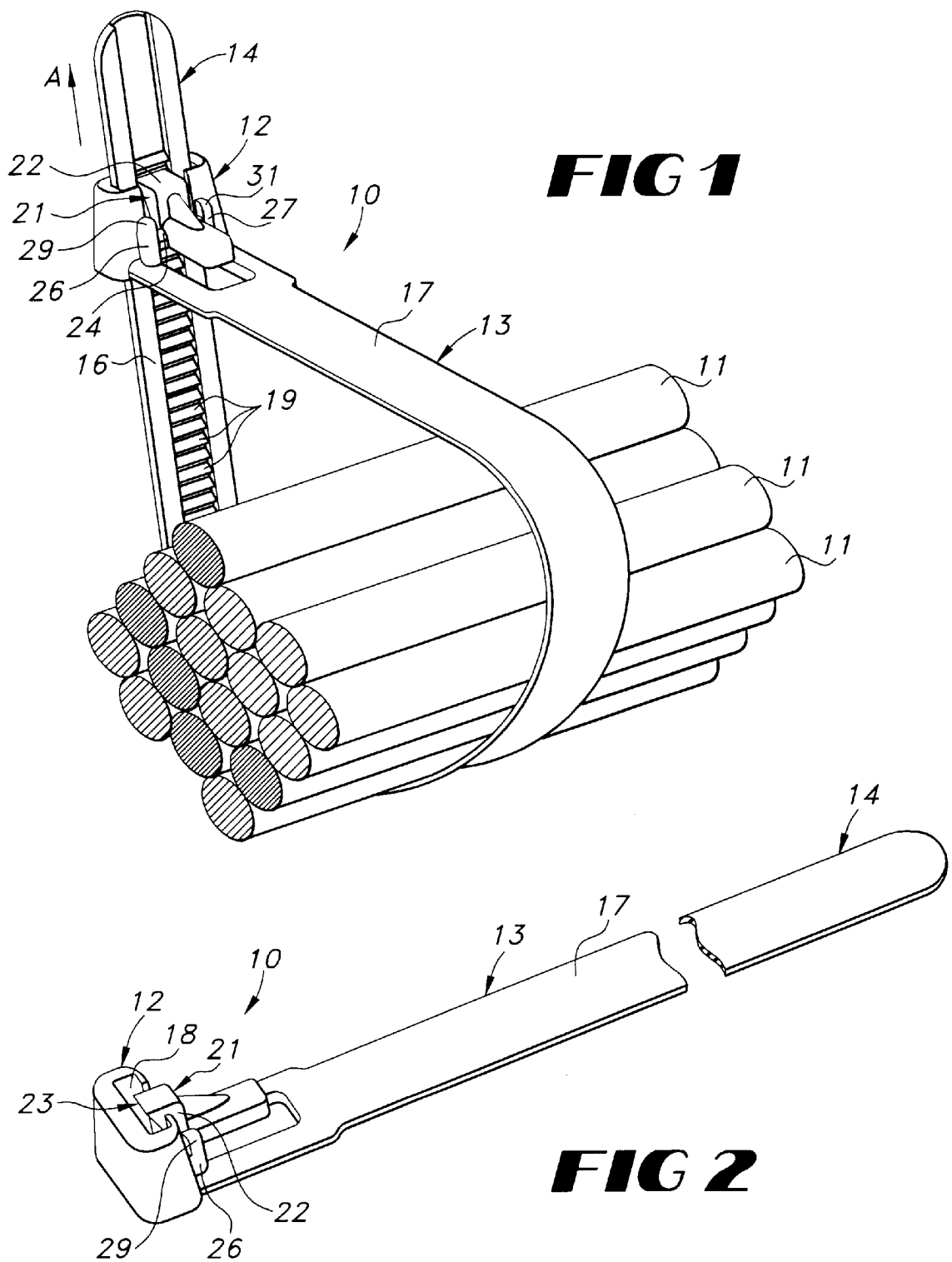

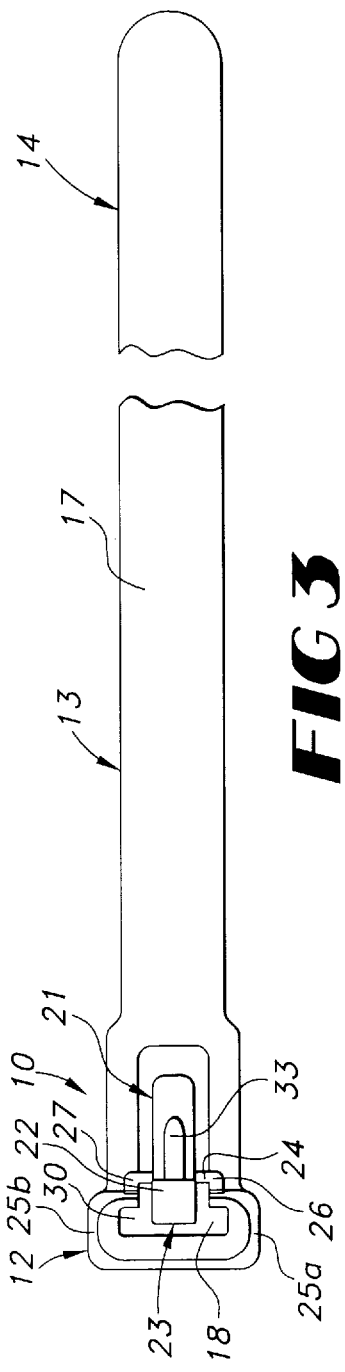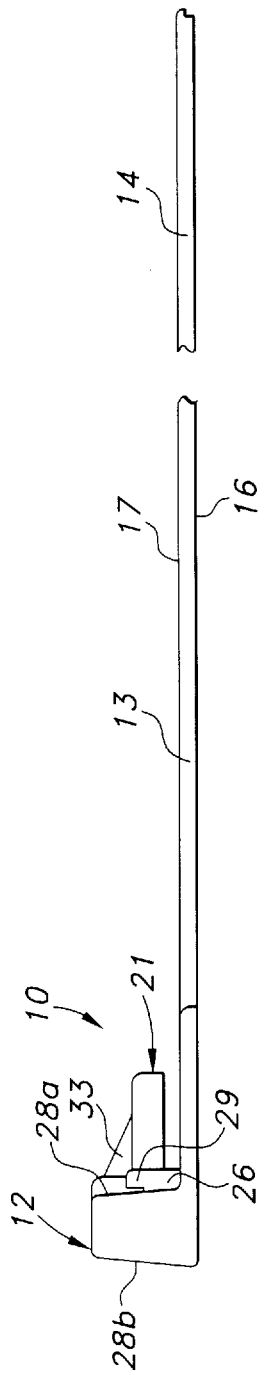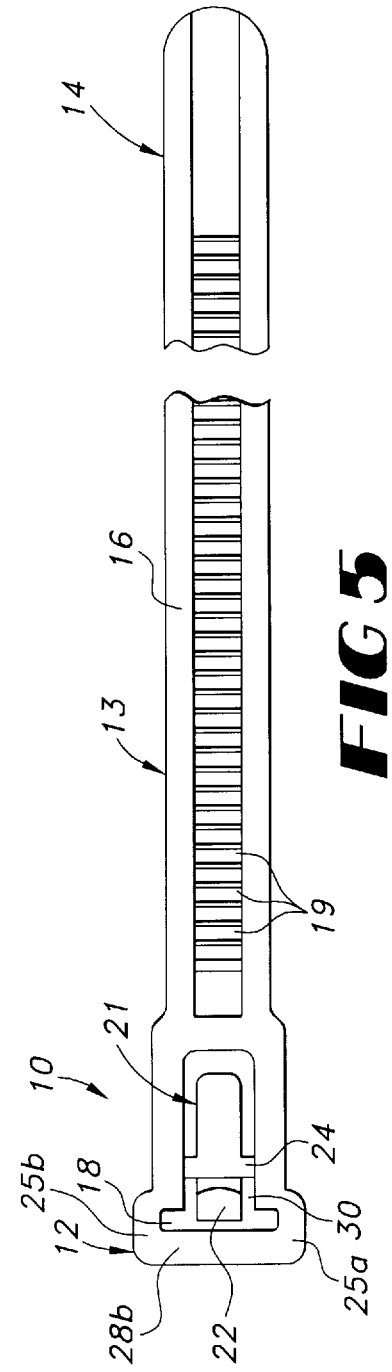

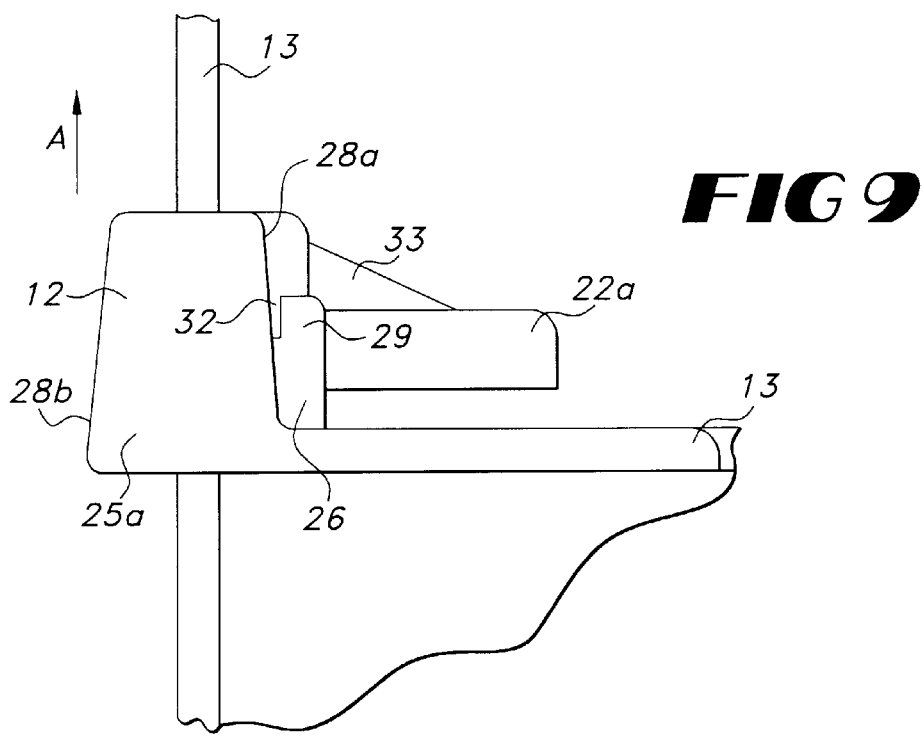
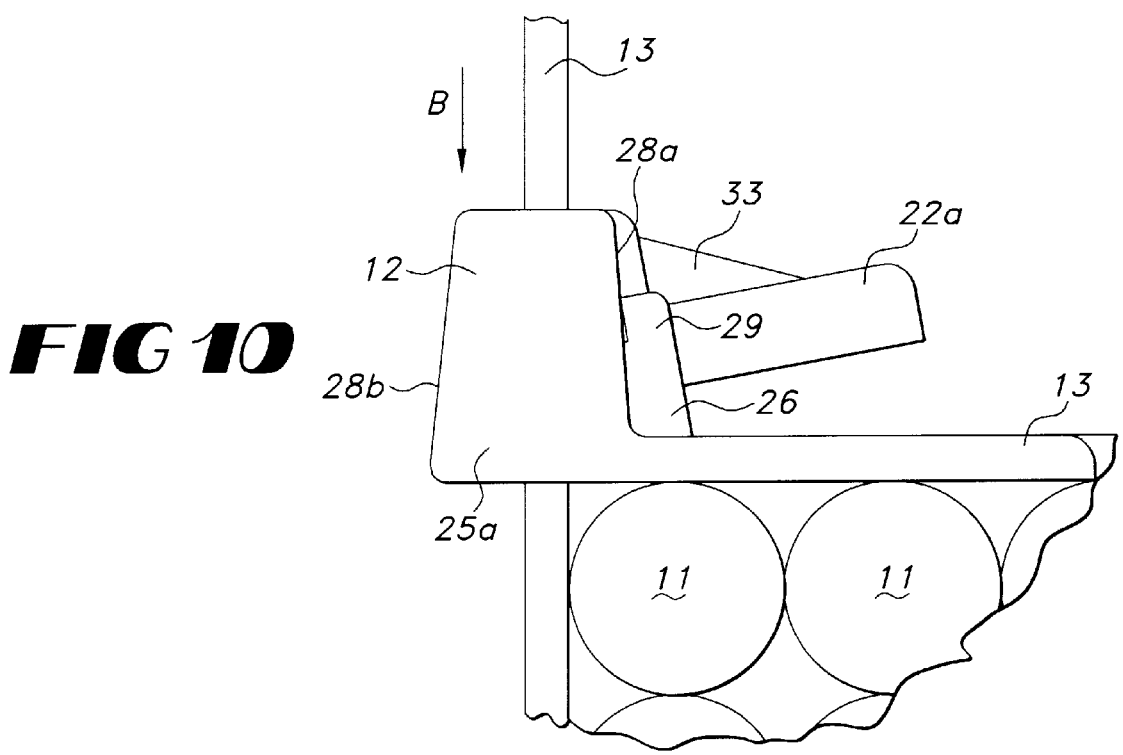

RELEASABLE CABLE TIE

This application claims the benefit of U.S. Provisional Application No. 60/077,257, filed Mar. 9, 1998.

BACKGROUND

The present invention relates generally to cable ties or elongate straps having a locking head at a first end that secures a second end of the strap to form a loop fastener. More particularly, the present invention relates to a reusable cable tie having a releasable locking mechanism that allows removal of the second end of the strap from the locking head without destroying the locking mechanism such that the cable tie can be removed and reused.

A variety of plastic cable ties have been employed in the past for supporting together, storing and/or transporting bundles of elongated elements such as elongated wires, tubes or similar members. Such ties typically include a locking-head having a toothed locking pawl pivotally mounted and extending into a strap-receiving aperture, and an elongated flexible strap having a series of transverse teeth on one surface thereof (or a ladder-type strap having two spaced side rails joined by a plurality of spaced rungs) for engagement with the pawl, thus securing the free end of the strap in bound relationship about the wires, tubes or similar members. These ties are available in both releasable and non-releasable versions with the former generally having a short release lever or extension extending from the pawl sufficiently beyond the locking head to the strap to allow user manipulation of the lever or extension to pivot the pawl out of engagement with the teeth or rungs on the cable tie and release the strap from the head. In releasing the tie, the strap typically must be pulled at least a short distance through the locking head in the strap tightening direction to allow the pawl to pivot out of engagement with the strap.

A disadvantage in the known releasable cable tie, however, is that the hinge or pivot area connecting the pawl to the head of the cable tie is typically inadequate in terms of support and strength. Known cable ties rely on the conventional idea of using the same pivot area to predict insertion and tensile force. Insertion force is high if the hinge or pivot area is too large and tensile force is low if the pivot area is too small. It is, therefore, desirous to provide a releasable cable tie that has a relatively low insertion force, yet is able to withstand higher tensile forces than conventional cable ties.

SUMMARY

The present invention addresses the above needs by adding adequate support and strength to the hinge or pivot area of the pawl or latch so that the cable tie can withstand greater forces than the conventional releasable cable tie. Specifically the present invention adds at least one extension to the pivot/hinge area that does not interfere during installation of the tie whereby insertion force remains the same. But under load, the extension engages the head of the cable tie essentially doubling the pivot area and thus increasing its potential for higher tensile force.

More specifically, the present invention provides a releasable cable tie for forming a plurality of elongate objects such as wires into a bundle which comprises an elongate strap body having a tail and first and second major surfaces wherein the first major surface includes a plurality of teeth. A head is integrally formed at one end of the strap body opposite the tail. The head includes first and second sidewalls and first and second endwalls which define a passageway or channel therethrough for receiving the tail and strap body. The first sidewall includes a slot which is in communication with the passageway, the tail being insertable into the passageway in a locking direction for forming a loop to receive the objects to be bound. In addition, first and second shoulders are integrally attached to the first sidewall on opposite sides of the slot in opposing relation. The shoulders include first and second upwardly extending reinforcing extensions, respectively, which are each spaced a predetermined distance from the first sidewall so as to create an interstice between the extensions and first sidewall. A bridging member extends between the first and second shoulders. The head further includes a latch means for releasably retaining the strap body within the head. The latch means comprises a latch pivotally mounted on the bridging member and has at least one locking tooth complementary to each of the plurality of teeth on the strap body. The latch extends into the passageway through the slot such that the locking tooth engages a selected one of the plurality of teeth for substantially preventing movement of the strap body in a release direction. When the cable tie is under load in a locked position, the first and second reinforcing extensions deflect to engage the first sidewall for adding strength to the latch which enables the tie to withstand greater tensile forces. Because the latch is pivotal about the longitudinal axis of said bridging member, it may be pivoted to release the locking tooth from engagement with the selected one of plurality of teeth to permit the strap body to be moved in the release direction, the strap body being easily releasable from the head thereby allowing the tie to be reusable.

BRIEF DESCRIPTION OF THE DRAWINGS

The features of this invention which are believed to be novel are set forth with particularity in the appended claims. The invention, together with its objects and advantages thereof, may be best understood by reference to the following detailed description taken in conjunction with the accompanying drawings in which like reference numerals identify like elements in the figures and in which:

FIG. 1 is a perspective view of a representative releasable cable tie embodying the features of the present invention;

FIG. 2 is another perspective view of the releasable cable tie of FIG. 1;

FIG. 3 is a top plan view of the releasable cable tie of FIG. 1;

FIG. 4 is a side elevational view of the releasable cable tie of FIG. 1;

FIG. 5 is a bottom plan view of the releasable cable tie of FIG. 1;

FIG. 9 is an enlarged fragmentary side view of the head of the releasable cable tie of FIG.1; and FIG. 10 is an enlarged fragmentary side view of the head of the releasable cable tie of FIG. 1.

DETAILED DESCRIPTION

Figure 6:
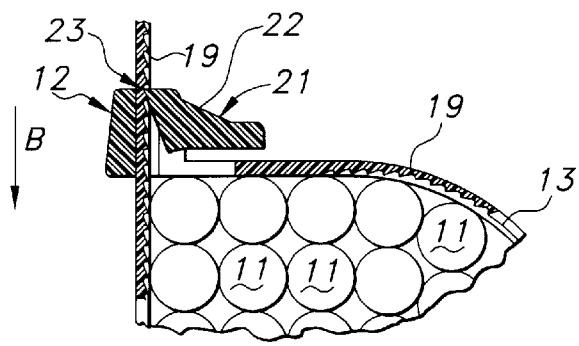
FIG. 6 is a side elevational view partially in section of the releasable cable tie of FIG. 1.

Referring to the drawings, a representative releasable cable tie according to the present invention for forming and holding at least one elongate object, such as wires or cables 11, together in a bundle is generally indicated throughout the figures by reference numeral 10. Cable tie 10 is integrally molded from a suitable synthetic organic plastic resin, such as a polyamide resin, which possesses sufficient strength and resiliency to permit the desired working thereof, as well as the desired latching and release. Tie 10 is an elongate member including a head 12, an opposed tail 14, and an elongate strap body 13 therebetween. Strap body 13 is typically planar shaped having first and second opposed major surfaces 16 and 17 and is formed in any desired length necessary to encompass the diameter of the object or objects 11 to be fastened. The first major surface 16 includes a plurality of transversely extending locking teeth 19 which are longitudinally spaced along the length of strap 13. When the tie 10 is in a locked position, the first major surface 16 is oriented inwardly toward the objects 11 being bundled so that the teeth 19 may serve to enhance the grip upon the objects 11 being bundled.

First 28a and second 28b sidewalls and first 25a and second 25b endwalls of head 12 cooperate to define a strap positioning channel or passageway 18 which extends through head 12 and is sized accordingly to slidingly receive strap body 13. The extreme end of tail 14 may be tapered or rounded so as to easily facilitate entry into the passageway 18. Head 12 further includes a pivotally supported generally rigid latch means 21 which includes an actuating member or latch 22 with at least one locking tooth 23. The locking tooth 23 is designed to extend a sufficient distance into passageway 18 through a slot 30 in first sidewall 28a of head 12 to cooperate with a complementary tooth 19 on the strap body 13 thereby retaining or locking body 13 within head 12 in securement about members to be bound together. Latch 22 is integrally molded with the head 12 so as to be deflectable relative thereto by means of its joinder at the lower end so as to release the locking tooth 23 (or teeth if there are two or more) from engagement with a selected tooth 19 on strap body 13. Such release allows body 13 to move in a release direction in passageway 18 thereby permitting strap body 13 to be removed from passageway 18 or adjusted as desired. Latch 22 may also be oriented on head 12 to extend inwardly toward the objects 11 being bundled.

Figure 8:
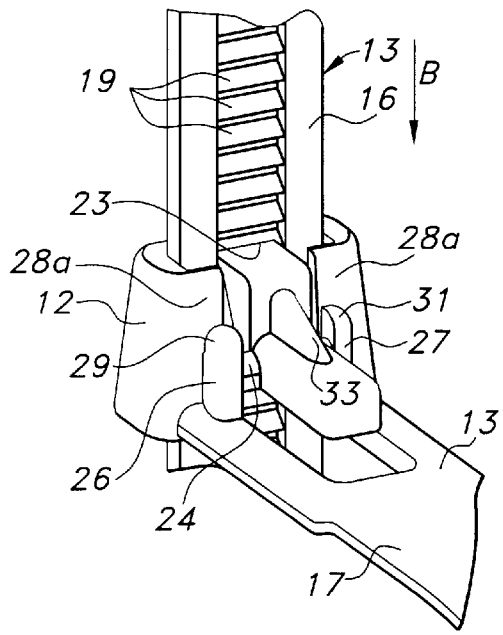
FIG. 8 is an enlarged fragmentary perspective view of the head of the releasable cable tie of FIG. 1.

In order to pivotally mount latch 22 to the tie 10, latch means 21 includes an integrally formed lower bridging member 24 to which the latch 22 is joined, the longitudinal axis of the bridging member 24 extending generally transverse to the longitudinal axis of the strap body 13. The bridging member 24 not only supports the latch 22, its longitudinal axis defines the pivot axis of the latch 22. In a preferred embodiment, the bridging member 24 extends between first and second reinforcing shoulders, 26 and 27, which are integrally attached to first sidewall 28a on opposite sides of slot 30 in opposing relation. Generally speaking, shoulders 26 and 27 serve to provide additional strength to the sidewall 28a. In addition, first 26 and second 27 shoulders include reinforcement means for adding strength to the latch 22 when the cable tie 10 is in a locked position comprising first 29 and second 31 upwardly extending reinforcing extensions, respectively. Extensions 29 and 31 are spaced or separated from the head 12 a predetermined distance from sidewall 28a so as to create an interstice 32 between the extensions and the sidewall when the tie 10 is in the unlocked position, as best illustrated in FIGS. 1–4 and 9. As will be discussed below in greater detail, the extensions 29, 31 abut or engage sidewall 28a to reinforce or add strength to the latch 22 when the tie 10 is in its locked position so that the latch can withstand greater forces than conventional releasable cable ties, as best shown in FIGS. 8 and 10. In order to provide additional reinforcing structure to the latch 22, webbing 33 may be provided on the latch 26 which joins the upright portion of latch 22 just above the bridging member 24.

In operation, tail 14 is wrapped around an article or group of articles, such as cables 11, and is inserted in the direction of arrow A into passageway 18 of head 12, as shown in FIGS. 1 and 9. Continued insertion of tail 14 and strap body 13 through passageway 18 in the direction of arrow A causes latch 22 to pivot away from passageway 18 and strap body 13 so that tail 14 and body 13 may pass through head 12. As is known in the art, the pivoting of the latch 22 during insertion of tail 14 and body 13 actually includes a rotation and deflection about the longitudinal pivot axis of bridging member 24 every time locking tooth 23 consecutively engages a tooth 19 on body 13. Thus, the primary resistance to the insertion force required to thread body 13 through head 12, which is minimized in the present invention, is the result of locking tooth 23 sequentially engaging respective teeth 19 on body 13. Extensions 29 and 31 do not provide resistance during the installation of strap body 13 into head 12. Next, tail 14 is pulled through passageway 18 of head 12 until the strap body 13 is snugly drawn about the plurality of elongated objects 11 to be bundled.

Figure 7:
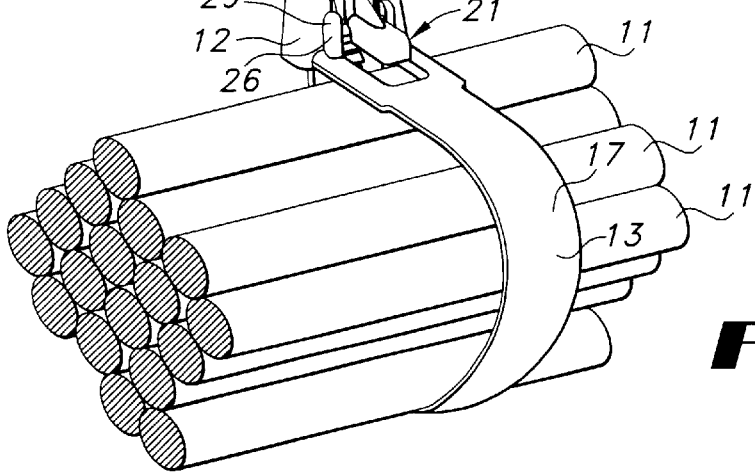
FIG. 7 is a perspective view of the releasable cable tie of FIG. 1.

With the strap body 13 tightly drawn about the objects 11, the release or severing of strap body 13 results in forces acting in the direction of arrow B to recoil strap body 13 out of head 12. However, retrogression or movement in the release direction B is substantially prevented because the recoiling force causes locking tooth 23 to engage a cooperating selected tooth 19 on strap body 13 in a conventional manner so that latch 22 counter-rotates and deflects back towards body 13 in a direction opposite the insertion pivot direction to lock the strap in a selected position. Accordingly, the natural tendency of the complementary teeth 19, 23 is to more firmly engage one another when strap body 13 is urged in a release direction B. Latch 22 will continue to counter-rotate and deflect about the pivot axis of bridging member 24 until the first 29 and second 31 upwardly extending extensions engage sidewall 28a to reinforce latch 22, as shown in FIGS. 7–8 and 10, at which point retrogression movement of body 13 in the direction of arrow B is prevented thereby securing tie 10 in a locked position. Thus, it can be seen that the pivoting of latch 22 about bridging member 24 translates into deformation of shoulders 26, 27 such that extensions 29, 31 pivot and engage sidewall 28a when the tie 10 is in the locked position. Once the extensions 29, 31 have engaged sidewall 28a, they contribute significantly to the strength of latch 22 allowing the latch and tie 10 to withstand greater tensile forces, yet do not increase the insertion force required to thread strap body 13 through head 12.

Release of the locking tooth 23 from the selected locking tooth 19 is conventionally attained by a positive downward force being applied upon portion 22a of latch 22. Such force pivots the latch 22 relative to the bridging member 24 thereby releasing the locking tooth 23 from engagement with the selected tooth 19 on the strap body 13. The strap body 13 can now be moved in either direction A or B in passageway 18 so as to permit adjustment or removal of the tie 10 from the objects 11. Accordingly, it is apparent from the foregoing description that the tie 10 is readily releasable by means of the integral latch and can be easily reapplied and adjusted as desired.

While a presently preferred embodiment of the invention is shown, it should be understood that it is subject to modification and it is intended that the invention be limited only within the scope of the appended claims.

What is claimed is:

1. A releasable cable tie comprising:

an elongate strap body having a major surface including a plurality of locking teeth therealong;

a head supported at one end of said strap body having an aperture therein for insertably accommodating the other end of said strap body in an insertion direction; and a latch pivotally supported by said head and having a locking tooth disposed within said locking aperture and engageable with said locking teeth of said strap body, said latch being pivotable in a first direction to permit strap insertion, and in an opposite second direction to place said locking tooth of said latch in locking engagement with said teeth of said strap body, said latch being further pivotally movable in said first direction under manual actuation to release said latch from said locking engagement with said strap to permit withdrawal of said strap from said head aperture in a withdrawal direction opposite said insertion direction, said latch further including a latch wall engageable with a wall of said head upon continued pivotal rotation of said latch in said second direction caused by an attempt to withdraw said strap without said manual actuation of said latch, to prevent over rotation of said latch in said second direction and thereby preventing withdrawal of said strap.

2. A releasable cable tie of claim 1 wherein said latch further includes an extending actuating member further permitting said manual actuation of said latch.

3. A releasable cable tie of claim 2 wherein said latch further includes a bridge member extending across said head aperture and forming said pivotal securement of said latch to said head, said actuation member and said locking tooth extending from said bridge member.

4. A releasable cable tie of claim 3 wherein said bridge member includes a pair of shoulders for securing said bridge member to said head on either side of said head aperture.

5. A releasable cable tie of claim 4 wherein said pair of shoulders include shoulder extensions defining said latch wall, said shoulder extensions being engageable with said head on either side of said head aperture.

6. A releasable cable tie of claim 3 wherein said latch includes a reinforcing web at said bridge member.

7. A releasable cable tie of claim 3 wherein said latch includes a plurality of said teeth.

8. A releasable cable tie of claim 7 wherein said latch includes a plurality of said locking teeth.

* * * * *